United States Patent [19]

Messenger

[11] 4,173,999
[45] Nov. 13, 1979

[54] TECHNIQUE FOR CONTROLLING LOST CIRCULATION EMPLOYING IMPROVED SOFT PLUG

[75] Inventor: Joseph U. Messenger, Dallas, Tex.

[73] Assignee: Mobil Oil Corporation, New York, N.Y.

[21] Appl. No.: 836,642

[22] Filed: Sep. 26, 1977

[51] Int. Cl.$^2$ .................. E21B 33/138; E21B 33/13
[52] U.S. Cl. ........................ 166/293; 175/72; 252/8.5 LC
[58] Field of Search ........... 252/8.5 LC, 8.5 M, 8.5 P; 175/72; 166/293

[56] References Cited

U.S. PATENT DOCUMENTS

| | | | |
|---|---|---|---|
| Re. 24,942 | 2/1961 | Howard et al. | 166/294 |
| 2,776,112 | 1/1957 | Ilfrey et al. | 166/293 X |
| 2,800,964 | 7/1957 | Garrick | 166/293 X |
| 2,990,016 | 6/1961 | Goins et al. | 175/72 |
| 3,126,958 | 3/1964 | Bearden et al. | 166/293 |
| 3,467,208 | 9/1969 | Kelly | 175/72 |
| 3,724,564 | 4/1973 | Messenger | 175/72 |
| 3,876,006 | 4/1975 | Messenger | 166/293 |
| 3,987,855 | 10/1976 | Messenger | 166/294 |

*Primary Examiner*—Herbert B. Guynn
*Attorney, Agent, or Firm*—C. A. Huggett; Henry L. Ehrlich

[57] ABSTRACT

This specification discloses a method of controlling the loss of drilling fluid into a lost circulation zone of a subterranean earth formation penetrated by a well. A nonaqueous slurry of a hydratable material and an oleophilic clay is introduced into the well and mixed in the vicinity of the lost circulation zone with an aqueous liquid to form a soft plug.

4 Claims, No Drawings

TECHNIQUE FOR CONTROLLING LOST CIRCULATION EMPLOYING IMPROVED SOFT PLUG

BACKGROUND OF THE INVENTION

This invention relates to the drilling of a well into the earth and more particularly is concerned with a technique for controlling lost circulation.

In the drilling of a well into the earth by rotary drilling techniques, a drill bit is attached to a drill string and the drill bit is rotated in contact with the earth to cut and break the earth and form a well therein. Drilling fluid is circulated between the surface of the earth and the bottom of the well to remove drill cuttings therefrom, lubricate the bit and drill string, and apply hydrostatic pressure in the well to control the flow of fluids into the well from earth formations penetrated by the well. Drilling fluids commonly employed include gaseous and liquid drilling fluids. Liquid drilling fluids, often called "drilling muds", may be, for example, water base, oil base, or emulsions. Drilling fluids are normally treated by including additives therein to provide desired rheological properties which make them particularly suitable for use in drilling wells.

In the drilling of a well into the earth, a problem sometimes occurs which is referred to as "lost circulation" and which involves the loss of unacceptably large amounts of whole drilling fluid into a formation penetrated by a well. Such a formation or portion thereof that accepts the drilling fluid is commonly termed a "lost circulation zone". Lost circulation may occur when the well encounters a formation of unusually high permeability or one which has naturally occurring fractures or fissures. Lost circulation may also occur by the inadvertent fracturing of a formation during drilling operations. Such fracturing sometimes occurs when the density of the mud is increased to provide a sufficiently high hydrostatic pressure to control high formation pressures. Other inadvertent fracturing of formations sometimes occurs because of fluctuations of the hydrostatic pressure imposed on formations due to movements of the drill string and drill casing in a well.

Many techniques have been used to control lost circulation. One such technique involves increasing the viscosity of a slug of the drilling fluid in order to increase its resistance to flow into the formation. Other techniques include the addition of bulk material, such as cottonseed hulls, sawdust, and ground walnut shells, to the drilling fluid to seal the lost circulation zone. Still other techniques involve the forming of plugs in a well to alleviate the loss of drilling fluid into the lost circulation zones.

In U.S. Pat. No. 2,801,077 to Howard et al. which reissued as U.S. Pat. No. Re. 24,942, there is described a technique of regaining circulation wherein a gel is formed in the well and forced into the lost circulation zone. This technique involves forming a slurry of a nonaqueous liquid and hydraulic cement and a clay and pumping the slurry down the well through a drill pipe while simultaneously pumping an aqueous liquid down the well so as to mix at the location of the lost circulation zone the slurry with the aqueous liquid. The clay and cement hydrate and form a gel which is forced into the lost circulation zone.

In U.S. Pat. No. 3,467,208 to Kelly, Jr., there is described a method of controlling lost circulation wherein an aqueous suspension of an oleophilic colloid which is both water and oil dispersible is circulated down a drill string in a well and into the wellbore where it is contacted with an oleaginous liquid to form a gel which tends to plug the formation into which lost circulation occurs.

In U.S. Pat. No. 2,800,964 to Garrick, there is described a process wherein a bridging material, a nonaqueous slurry of finely divided clay, and an aqueous liquid such as a drilling mud are combined within a well to produce a mixture in the well which is too viscous or plastic to be pumped but which can be displaced into a lost circulation zone. In U.S. Pat. No. 2,990,016 to Goins, Jr. et al., a concentrated slurry of a hydratable material in an inert carrier liquid is pumped down a borehole in one well channel and substantially simultaneously an aqueous liquid is pumped down the borehole through a second well channel. The two liquids are mixed in a borehole adjacent to the formation causing lost circulation to partially hydrate the hydratable material. A stiff sealing composition is formed by the partial hydration of the hydratable material and is squeezed into the lost circulation formation wherein further hydration of the hydratable material occurs, causing it to swell and harden to close the fissures.

In U.S. Pat. No. 3,724,564 to Messenger, there is described a method of controlling lost circulation by circulating down a well and into the vicinity of a lost circulation zone an aqueous mixture of a dispersing agent, an inert particulate material, and a water dispersible oleophilic colloid and mixing the aqueous mixture with an oleaginous liquid in the vicinity of the lost circulation zone to form a gel which tends to plug the formation into which lost circulation is occurring.

In U.S. Pat. No. 3,876,006 to Messenger, a method is described of alleviating lost circulation problems by mixing within the well and immediately above an incompetent formation an aqueous liquid and a slurry of a nonaqueous liquid and hydratable material to form an aqueous liquid-rich soft plug. This plug is displaced down the well and into the lost circulation zone to alleviate the loss of drilling fluid thereinto. In U.S. Pat. No. 3,987,855 to Messenger, there is described a method of controlling an active zone that is penetrated in the drilling of a well by forming a mixture of inert particulate material and an oil wetting dispersing agent in a light oil and circulating the mixture to a lower portion of the well and maintaining it there to allow the inert particulate material to separate from the light oil and form a plug in the well.

SUMMARY OF THE INVENTION

This invention is directed to a method of alleviating the loss of drilling fluid into a subterranean formation penetrated by the well. A slurry formed of a nonaqueous liquid, a hydratable material, and an oleophilic clay is displaced down the well and into the vicinity of the formation and is there mixed with an aqueous liquid to form a soft plug.

DESCRIPTION OF THE PREFERRED EMBODIMENT

This invention is directed to a method of controlling or alleviating the loss of whole liquid drilling fluid, often referred to as drilling mud, into a lost circulation zone of a subterranean formation that is penetrated by a well during the drilling of a well.

The use of soft plugs for controlling lost circulation problems in the drilling of wells has long been described and used in the field. There have been instances, however, when attempting to pump a nonaqueous slurry of a hydratable material down a drill string in a well to control a lost circulation zone that the drill string has been plugged by the slurry before it could be displaced therefrom and mixed with an aqueous fluid in the well to there form a plug for controlling the lost circulation zone. Possible causes for plugging of the drill string by the nonaqueous slurry containing hydratable material are due to (1) dehydration or loss of the liquid phase of the nonaqueous slurry at restrictions or small leaks in the drill string, and (2) partial hydration of the hydratable material due to water in the nonaqueous liquid of the slurry.

I have discovered that this problem of plugging the drill string can be avoided by including a solids suspending agent in the nonaqueous slurry along with the hydratable material. I have also discovered that further beneficial effects are realized by including both a solids suspending agent and an oil wetting dispersing agent in the nonaqueous slurry along with the hydratable material. The inclusion of both a solids suspending agent and an oil wetting dispersing agent results in a slurry with better flow properties, greater solids suspension and a lower filter loss—all effective in preventing plugging of the drill string.

In accordance with this invention, when drilling a well and loss of drilling fluid into a lost circulation zone of an incompetent subterranean formation occurs, a nonaqueous slurry is formed of a nonaqueous liquid, a hydratable material and a solids suspending agent, which slurry may also include therein an oil wetting dispersing agent. The slurry is introduced into the well, normally through the drill string, and is displaced down the well into the vicinity of the incompetent formation. An aqueous fluid, normally drilling mud where water-based drilling mud is being employed in the drilling of the well, is displaced down the well normally through the annulus formed about the drill string and is mixed with the nonaqueous slurry in the vicinity of the incompetent formation to form a gel which is referred to as a soft plug and the soft plug is then displaced or squeezed into the incompetent formation to prevent the loss of drilling fluid thereinto. In more detail, it is common practice when a lost circulation zone of an incompetent subterranean formation is penetrated and drilling fluid is lost thereinto to raise the drill string from the bottom of the well and position it such that the lower end thereof is located immediately above the incompetent formation. The drill bit may be removed and a mixing sub installed if desired to insure better mixing of the nonaqueous slurry with an aqueous fluid. The nonaqueous slurry is then pumped down the drill string within the well, usually preceded and followed by a nonaqueous spacer. The annulus about the drill string is filled with an aqueous liquid, usually an aqueous drilling mud, and concomitantly with the pumping of the slurry down the drill string the aqueous liquid is pumped down the annulus. The pumping rates for the nonaqueous slurry and the aqueous liquid are adjusted to obtain a desired ratio of mix of the aqueous fluid with the nonaqueous slurry at the lower end of the drill string. Upon mixing there, the soft plug is formed and is displaced into the incompetent subterranean formation. Hydrostatic pressure is held on the soft plug for sufficient time to allow the soft plug to become established in the lost circulation zone whereby the lost circulation zone is controlled.

The ratios of the amounts of material used in forming the nonaqueous slurry of this invention are as follows: hydratable material, 300 to 800 pounds per barrel of nonaqueous liquid; solids suspending agent, 0.1 to 5.0 pounds per barrel of nonaqueous liquid; and dispersing agent, 0.5 to 3.0 pounds per barrel of nonaqueous liquid. The most commonly used hydratable materials are bentonite, cement and mixtures thereof, though other hydratable materials such as attapulgite may also be used. A preferred ratio of bentonite to cement is 100 pounds of bentonite to 188 pounds of cement. A slurry formed using this preferred ratio of bentonite to cement has good flow properties which facilitates its placement in a well and yields a strong soft plug.

In carrying out this invention, preferred nonaqueous liquids for use are light hydrocarbon oils such as diesel oil and kerosene. Such light hydrocarbon oils are preferred because of their low cost and ready availability at most well sites. The preferred solids suspending agent is an oleophilic clay. Such a clay is a water swellable clay which has undergone treatment to render it oleophilic. Examples of suitable oleophilic clays are the bentonites or other clays which have been treated with an oil wetting surfactant such as a long chain quaternary or nonquaternary amine. For a more detailed description of such clays and the method of preparation, reference is made to CHEMICAL ENGINEERING, March 1952, pp. 226–230; U.S. Pat. No. 2,531,812 to Hauser; and U.S. Pat. No. 2,675,353 to Dawson. Suitable oleophilic clays may also be prepared by dehydrating a hydrophilic clay such as bentonite and then treating the dehydrated clay with a glycol or glycol ether. For a more detailed description of this procedure, reference is made to U.S. Pat. No. 2,637,692 to Nahin. Suitable oleophilic clays are available under the trade names of "Geltone" and "Petrotone".

The oil wetting dispersing agents used in carrying out this invention may be any suitable "thinners" which are oil soluble and have the characteristics of oil wetting the surfaces of the hydratable materials employed in carrying out this invention. Examples of oil wetting dispersing agents which may be employed in carrying out this invention are given in TABLE I by trade name, distributor and chemical composition. Also given in TABLE I are the density of the dispersing agent and practicable amounts of dispersing agents which may be used in pounds per final barrel of the nonaqueous slurry.

TABLE I

Dispersant Description

| Trade Name of Dispersant | Distributor | Chemical Composition | Density lb/gal | Practicable Amounts to use in Plug lb/final bbl. |
|---|---|---|---|---|
| EZ-Mul | Baroid | Half amide salt terminated | 8.1 | 0.5 |
| Driltreat | Baroid | Lecithin | 8.7 | 0.5 |
| Surf-Cote | Milchem | Oil-soluble amine dodecyl benzene sulfonate | 8.16 | 1.0 |
| SA-47 | Oil Base, Inc. | Aryl alkyl sodium sulfonate | 8.12 | 0.5 |
| Fazethin | Magcobar | | | 1.0 |
| Ken-Thin | Imco | Imidazolin | 7.9 | 1.5 |
| SE-11 | Magcobar | Modified alkyl aryl sulfonate | 7.83 | 1.5 |

TABLE I-continued

| Trade Name of Dispersant | Distributor | Chemical Composition | Density lb/gal | Practicable Amounts to use in Plug lb/final bbl. |
|---|---|---|---|---|
| Carbo-Mul | Milchem | plus imidazoline Oil-soluble alkanol amide | 7.5 | 1.5 |

Laboratory tests have been run and the test results thereof have shown that the hydratable solids in a nonaqueous slurry used in forming a soft plug for controlling lost circulation can be completely suspended by adding a solids suspending agent thereto. Such a solids suspending agent is an oleophilic bentonite and concentrations thereof in the range from about 0.5 to 5.0 lb/bbl. of nonaqueous liquid used in forming the slurry are sufficient to provide for the complete suspension of the solids in the slurry. The oleophilic bentonite serves not only as a solids suspending agent but also as a retarding agent and slows down the speed with which an aqueous fluid will react with the hydratable material of the nonaqueous slurry. Retarding the reaction time further insures that the slurry may be displaced down the drill pipe, into the open hole and into the lost circulation zone before it sets up and forms a soft plug. The laboratory tests also show that the flow properties of the nonaqueous slurry are markedly improved by including therein an oil wetting dispersant or dispersing agent in a concentration within the range of about 0.5 to 3.0 lb/bbl. of nonaqueous liquid used in forming the slurry. The test results still further show that the inclusion of either the solids suspending agent or the dispersing agent or both significantly lower the API 30-minute filter loss of the slurry. The inclusion of both the solids suspending agent and the dispersing agent also allows the nonaqueous slurry to be densified, that is, allows higher concentrations of hydratable material to be included in the nonaqueous slurry, and thus enables the forming of a stronger soft plug in the vicinity of the lost circulation zone than otherwise would be possible.

A Hamilton Beach mixer was used for admixing the solids suspending agent and oil wetting dispersants into the diesel oil-bentonite and diesel oil-bentonite-cement slurries and samples were stirred at low speed for 10 minutes. In forming the soft plugs, the nonaqueous slurries and mud were placed in 400 ml. beakers and mixed as well as possible with the stirrer. The partially formed soft plugs were then poured out of the Hamilton Beach mixer and kneaded with a spatula until they were homogeneous. They were then placed in 2-inch cube molds and the shear strength after one hour at room temperature was determined. Compressive strengths in 24 hours at 170° F. were also determined for some samples.

The reactants used for forming the soft plugs were:

1. a 10 lb/gal. mud prepared as follows: 20 lb/bbl. of bentonite were hydrated in water and then 0.25 lb/bbl. caustic added. The weight was then raised to 10.0 lb/gal. with 100 lb/bbl. barite using sodium-acid-pyrophosphate (SAPP) to adjust the viscosity.

2. Diesel oil-bentonite-two cement (DOB2C) was prepared by adding two 94-lb. sacks of Class A (also Kaiser Class G) cement and one 100-lb. sack of bentonite to 26.5 gal. of summer diesel oil (7.0 lb/gal.). The slurry density was 12.4 lb/gal. and the slurry yield in cubic feet for 100-lb. sack of bentonite was 5.11.

3. Diesel oil-bentonite (DOB) composition of test samples shown by Sample 20 in TABLE II.

4. Diesel oil-cement (DOC) composition of test sample shown by Samples 19, 19a, 19b and 19c in TABLE II.

5. Geltone-Baroid's oleophilic bentonite.

6. Oil wetting dispersants—described in TABLE I.

The effects of the oil wetting dispersants shown in TABLE I and oleophilic bentonite as a suspending agent on solid suspension, filter loss, and flow properties of selected DOB2C's, DOB's, and DOC's were determined. Results of these tests are shown in TABLES II and III.

TABLE II

EFFECT OF OLEOPHILIC BENTONITE (GELTONE) AND AN OIL-WETTING DISPERSANT (SE-11) ON THE PROPERTIES OF DOB2C

| Sample No. | 1 | 2 | 3 | 4 | 5 | 6 | 7 | 8 | 9 | 10 |
|---|---|---|---|---|---|---|---|---|---|---|
| Composition: | | | | | | | | | | |
| Bentonite, gm | 158 | 158 | 158 | 158 | 158 | 158 | 158 | 158 | 158 | 158 |
| Class G Cement, gm | 298 | 298 | 298 | 298 | 298[b] | 298 | 298 | 298 | 298 | 298 |
| DOB2C[a] | | | | | | | | | | |
| Diesel Oil, cc | 294 | 294 | 294 | 294 | 294 | 294 | 294 | 294 | 294 | 294 |
| Geltone, gm | 0 | 0.5 | 1.0 | 2 | 0.875 | | | | 1.0 | 2.0 |
| SE-11, gm | | | | | | 0.5 | 1.0 | 2.0 | 2.0 | 1.0 |
| Water, cc | | | | | | | | | | 10 |
| EZ-Mul | | | | | | | | | | |
| Verthin | | | | | | | | | | |
| Properties: | | | | | | | | | | |
| Fann: 600 RPM | 99 | | | | | 74 | 66 | 49 | 50 | |
| 300 RPM | 76 | | | | | 51 | 41 | 25 | 29 | |
| Plastic Viscosity (M), cps | 23 | | | | | 23 | 25 | 24 | 21 | |
| Yield Pt. ($\phi$) lb/100 ft$^2$ | 53 | | | | | 28 | 16 | 1 | 8 | |
| i-gel, lb/100 ft$^2$ | 29 | | | | | 13 | 7 | 0 | 3 | |
| | Settles | Slight Settling | No Settling | No Settling | No Settling | | | | Settles | |
| API 30-Min. Filter Loss, cc | 1641 | | | | | | | 644 | 274 | 311 |
| Slurry Density, lb/gel | 12.3 | | | | | | | | | |

| Sample No. | 11 | 19 | 19 | 19b | 19c | 20 | 20a | 20b |
|---|---|---|---|---|---|---|---|---|
| Composition: | | | 175 cc of | 175 cc of | 175 cc of | | 175 cc of | 175 cc of |
| Bentonite, gm | 158(69)[c] | | 19 | 19a | 19a | 400 | 20 | 100 |
| Class G, Cement, gm | 298 | 588 | | 200 | 200 | | | |

TABLE II-continued
EFFECT OF OLEOPHILIC BENTONITE (GELTONE) AND AN OIL-WETTING DISPERSANT (SE-11) ON THE PROPERTIES OF DOB2C

| DOB2C[a] | (131)[c] | | | | | | | |
|---|---|---|---|---|---|---|---|---|
| Diesel Oil, cc | 294 | 294 | | | | 294 | | |
| Geltone, gm | | | | | 1 | | | |
| SE-11, gm | 2 | | | | | | | |
| Water, cc | | | | | | | | |
| EZ-Mul | | | 1 | 1 | 1 | | | |
| Verthin | | | | | | | 1 | 1 |
| Properties: | | | | | | | | |
| Fann: 600 RPM | THTM | 97 | 45 | THTM | THTM | 245 | 103 | |
| 300 RPM | 205 | 78 | 23 | 214 | 208 | 186 | 60 | |
| Plastic Viscosity (M), cps | | 19 | 22 | | | 59 | 43 | |
| Yield Pt. ($\phi$) lb/100 ft$^2$ | | 59 | 1 | | | 127 | 17 | |
| i-gel, lb/100 ft$^2$ | 6 | 10 | 0.5 Settles | 1 Settles | 15 | 15 | 3 | |
| API 30-Min. Filter Loss, cc | | 600 | | 60 | 110 | | 903 | 733 |
| Slurry Density, lb/gel | | | 13.8 | 17.0 | 17.0 | 11.2 | | |

[a]DOB2C contained 188 lb Class A Cement, 100 lb. of Gel and 26.5 gal of DO
[b]Class A cement
[c]Added for densification

TABLE III
EFFECT OF VARIOUS OIL-WETTING DISPERSANTS ON THE PROPERTIES OF DOB2C

| Sample No. | 7 | 12 | 13 | 14 | 15 | 16 | 17 | 18 |
|---|---|---|---|---|---|---|---|---|
| Composition: | | | | | | | | |
| Bentonite, gm | 158 | 158 | 158 | 158 | 158 | 158 | 158 | 158 |
| Cement, Kaiser Class G, gm | 298 | 298 | 298 | 298 | 298 | 298 | 298 | 298 |
| Diesel Oil, cc | 294 | 294 | 294 | 294 | 294 | 294 | 294 | 294 |
| SE-11 | 1 | | | | | | | |
| EZ-Mul, gm | | 1 | | | | | | |
| Diltreat, gm | | | 1 | | | | | |
| Kenthin, gm | | | | | 1 | | | |
| SA-4 7, gm | | | | | | 1 | | |
| Carbo-Mul, gm | | | | | | 1 | | |
| Surf-Cote, gm | | | | | | | 1 | |
| Farethin, gm | | | | | | | | 1 |
| Properties: | | | | | | | | |
| Fann: 600 | 66 | 47 | 47 | 58 | 44 | 61 | 48 | 50 |
| 300 | 41 | 24 | 24 | 37 | 23 | 41 | 25 | 28 |
| Plastic Viscosity (M), cps | 25 | 23 | 23 | 21 | 21 | 20 | 23 | 22 |
| Yield Point ($\phi$), lb/100 ft$^2$ | 16 | 1 | 1 | 14 | 2 | 21 | 2 | 6 |
| i-gel, lb/100 ft$^2$ | 7 | 1 Settles | 1 Settles | 6 | 1 Settles | 10 | 1 | 4 |
| Calc. API Filter Loss, cc in 30 Min. | 644 | 473 | 551 | 657 | 687 | 728 | 598 | 661 |
| Shear Strength, psi of a M-DOB2C formed by mixing 150 cc of Sample with 150 cc of 10 lb/gal barite-gel mud | 2.09 | 6.45 | 5.11 | 7.19 | 7.86 | 5.80 | 4.56 | 9.12 |
| Observations: | Reacts fast; DO break-out | Reacts fast; little DO break-out | Reacts fast; little DO break-out | Reacts fast; little DO break-out | Reacts fast; little DO break-out | Reacts fast; DO break-out | Reacts more slowly no DO break-out | Reacts fast; little DO break-out |

Using the kneading method, several ratios of the above systems with 10.0 lb/gal. mud were studied. The results of these tests are summarized in TABLE IV.

TABLE IV
PROPERTIES OF M-DOB2C's FORMED FROM DOB2C's CONTAINING GELTONE AND SE-11

| Sample No. | Composition of M-DOB2C (A) | Composition of M-DOB2C (B) | Vol. % (A) | (A) to (B) Ratio | Shear Strength psi | Compressive Strength psi (After 24 hrs at 140° F.) | Remarks |
|---|---|---|---|---|---|---|---|
| 1a | 10 lb/gal mud | Sample 1[a] | 67 | 1:2 | 109 | | Reacts fast; DO break-out |
| 1b | " | " | 50 | 1:1 | 3.20 | | Reacts fast; DO break-out |
| 1b | " | " | 50 | 1:1 | 1.30 | 780 | |
| 1c | " | " | 33 | 2:1 | 0.70 | | Reacts fast; DO break-out |
| 2a | " | Sample 2[b] | 67 | 1:2 | 16.0 | | Reacts fast; little DO break-out |

TABLE IV-continued
PROPERTIES OF M-DOB2C's FORMED FROM DOB2C's CONTAINING GELTONE AND SE-11

| Sample No. | Composition of M-DOB2C (A) | (B) | Vol. % (A) | (A) to (B) Ratio | Shear Strength psi | Compressive Strength psi (After 24 hrs at 140° F.) | Remarks |
|---|---|---|---|---|---|---|---|
| 2b | " | " | 50 | 1:1 | 3.46 | | Reacts fast; DO break-out |
| 2b | " | " | 50 | 1:1 | 1.17 | 540 | |
| 2c | " | " | 33 | 2:1 | 0.92 | | Reacts fast; DO break-out |
| 3a | " | Sample 3[c] | 67 | 1:2 | 7.19 | | Reacts fast; little DO break-out |
| 3b | " | " | 50 | 1:1 | 1.65 | | Reacts fast; DO break-out |
| 3b | " | " | 50 | 1:1 | 1.13 | 590 | |
| 3c | " | " | 33 | 2:1 | 0.73 | | Reacts fast; less DO break-out |
| 4a | " | Sample 4[d] | 67 | 1:2 | 4.18 | | Reacts fast; little DO break-out |
| 4b | " | " | 50 | 1:1 | 3.14 | | Reacts fast; DO break-out |
| 4b | " | " | 50 | 1:1 | 1.02 | 540 | |
| 4c | " | " | 33 | 2:1 | 0.90 | | Reacts more slowly; little DO break-out |
| 5a | " | Sample 5 | 67 | 1:2 | 0.67 | | Reacts more slowly; no DO break-out |
| 5c | " | " | 33 | 2:1 | 0.74 | | Reacts more slowly; no DO break-out |
| 7a | " | Sample 7 | 67 | 1:2 | 3.53 | | Reacts rapidly; no DO break-out |
| 7b | " | " | 50 | 1:1 | 2.09 | | Reacts rapidly; DO break-out |
| 7c | " | " | 33 | 2:1 | 0.95 | | Reacts rapidly; DO break-out |
| 9b | " | Sample 9 | 50 | 1:1 | 0.90 | | Reacts more slowly; no DO break-out |
| 20b | " | Sample 20[e] | 50 | 1:1 | 30.6 | | |

[a]Blank-contains no Geltone;
[b]Contains 0.5 lb/bbl Geltone;
[c]Contains 1.0 lb/bbl Geltone;
[d]Contains 2 lb/bbl Geltone;
[e]DOB-not DOB2C Solids will settle from DOB and DOB2C slurries in a short time without the presence of a suspending agent therein. Samples Nos. 3, 4, and 9 of TABLE II show that adding an oleophilic bentonite to these slurries will give better suspension of the solids. This inclusion of oleophilic bentonite therein will allow the slurries to be stored in inactive tanks without settling. Storage of the slurries may be desirable in carrying out a treatment of a well requiring a large amount of the nonaqueous slurries.

Sample 1 in TABLE II shows that a DOB2C slurry without a suspending agent or dispersant has a high yield point (53 lb/100 ft.$^2$) and initial gel strength (29 lb/100 ft.$^2$) but supports solids poorly. Samples 6–8 show that the addition of an oil wetting dispersant reduces the yield point from 53 to one pound per hundred square feet and the initial gel from 29 to 0. This change in properties would result in the rapid settling of solids from the nonaqueous slurry but, as shown by sample 9, the addition of one pound per barrel of Geltone imparts ideal flow properties to the DOB2C slurry. These ideal flow properties make the slurry easier to mix and to displace down a well. By changing the amount of Geltone and dispersant in the slurry, the flow properties may be regulated and the amount of hydratable material in the slurry may be increased over that which would be possible without the addition of the Geltone and dispersant.

The API filter loss of diesel oil-bentonite and diesel oil-bentonite-cement slurries without suspending agent or dispersant is high, over 1600 cc. in 30 minutes as shown by Sample 1, TABLE II. Having both a suspending agent and an oil wetting dispersant lowers the filter loss of all of these slurries markedly as shown by Samples 7, 8 and 10, TABLE II. Those of DOC were lowered the most from 600 to 60 cc. in 30 minutes as shown by Samples 19 and 19b, TABLE II.

As previously discussed, the addition of an oil wetting dispersant to DOB, DOBC, and DOC removes all yield and gel strength. This allows densification, that is, adding more dry cement, bentonite, and bentonite-cement mix without the viscosity becoming unmanageable. Densification allows the delivery of more active solids to the point of the lost circulation problem and also lowers the filter loss and increases the viscosity of the slurry.

The data in TABLE IV describes M-DOB2C (mud-diesel oil bentonite 2 cement) formed from DOB2C containing a suspending agent, Geltone, and an oil wetting dispersant, Magcobar's SE-11, and a 10.0 lb/gal. gel-barite mud. In these tests, Sample 1 contains no Geltone or SE-11; Sample 2 contains 0.5 lb/bbl. Geltone; Sample 3 contains 1.0 lb/bbl. Geltone; and Sample 4 contains 2.0 bl/bbl. Geltone. In the sample designations, the ratios of 10.0 lb/gal. mud to DOB2C slurry is as follows: (a) is a 1:2 ratio of mud to slurry, (b) is a 1:1 ratio of mud to slurry, and (c) is a 2:1 ratio of mud to slurry. The amount of Geltone has a definite retarding effect on the development of shear strength after one hour of M-DOB2C containing a 1:2 mud to DOB2C ratio; shear strength falls from 109 psi at 0 lb/bbl. to 4.2 psi at 2.0 lb/bbl. At higher mud to DOB2C ratios, this effect disappears. Also for all samples, the compressive strength of the M-DOB2C is not similarly lowered. Sample 7 of TABLE IV contains 1.0 lb/bbl. of SE-11. Sample 9 of TABLE IV contains 1.0 lb/bbl. of both Geltone and SE-11, and shows about one-third of the shear strength of the M-DOB2C containing Geltone or SE-11 alone.

What is claimed is:

1. In the drilling of a well, the method of alleviating the loss of whole liquid drilling fluid into a lost circulation zone of an incompetent subterranean formation penetrated by said well, comprising:
   (a) introducing into a drill string positioned in said well to extend to the vicinity of said lost circulation zone a slurry comprised of a nonaqueous liquid, a hydratable material in an amount sufficient to form a soft plug and within the range of 300 to 800 pounds per barrel of said nonaqueous liquid and a solids suspending agent comprised of oleophilic clay in an amount within the range of about 0.1 to 5.0 pounds per barrel of said nonaqueous liquid to suspend said hydratable material in said nonaqueous liquid;
   (b) displacing said slurry down said drill string and into the vicinity of said lost circulation zone;
   (c) displacing an aqueous liquid down an annulus formed about said drill string to mix said slurry and said aqueous liquid in said vicinity of said lost circulation zone and form a soft plug; and
   (d) displacing said soft plug into said lost circulation zone to alleviate the loss of whole liquid drilling fluid thereinto.

2. The method of claim 1 wherein said hydratable material is selected from the group consisting of bentonite, cement, and mixtures thereof.

3. In the drilling of a well, the method of alleviating the loss of whole liquid drilling fluid into a lost circulation zone of an incompetent subterranean formation penetrated by said well, comprising:
   (a) introducing into a drill string positioned in said well to extend to the vicinity of said lost circulation zone a slurry comprised of a nonaqueous liquid, a hydratable material in an amount sufficient to form a soft plug and within the range of 300 to 800 pounds per barrel of said nonaqueous liquid and an oleophilic clay in an amount within the range of 0.1 to 5.0 pounds per barrel of said nonaqueous liquid to serve as a suspending agent and an oil wetting dispersing agent in an amount within the range of 0.1 to 3.0 pounds per barrel of said nonaqueous liquid;
   (b) displacing said slurry down said drill string and into the vicinity of said lost circulation zone;
   (c) displacing an aqueous liquid down an annulus formed about said drill string to mix said slurry and said aqueous liquid in said vicinity of said lost circulation zone and form a soft plug; and
   (d) displacing said soft plug into said lost circulation zone to alleviate the loss of whole drilling fluid thereinto.

4. The method of claim 3 wherein:
   (a) said nonaqueous liquid is diesel oil;
   (b) said hydratable material is a mixture of bentonite and cement mixed in a ratio of about 100 pounds of bentonite per 188 pounds of cement;
   (c) said oleophilic clay is present in an amount of about 1.0 pounds per barrel of said diesel oil; and said dispersing agent is present in an amount of about 2.0 pounds per barrel of slurry.

* * * * *

UNITED STATES PATENT AND TRADEMARK OFFICE
CERTIFICATE OF CORRECTION

PATENT NO. : 4,173,999
DATED : November 13, 1979
INVENTOR(S) : Joseph U. Messenger It is certified that error appears in the above-identified patent and that said Letters Patent are hereby corrected as shown below:

Table II, columns 5 and 6, last line on page, "298" should read --298(131)$^{(c)}$-- and delete "(131)$^{(c)}$" from top of next page under columns 7 and 8.

Table III, under Composition, referring to "Kenthin", under Sample 14, insert --1-- and cancel "1" under Sample 15; referring to "SA-47,gm", under Sample 15, insert --1-- and cancel "1" under Sample 16.

Table IV-continued, columns 9 and 10, cancel all information on bottom line of table which refers to "20b" and show as follows:
--20b   "   Sample 20$^{(e)}$   50   1:1   30.6--
(leaving blank under Remarks)

Signed and Sealed this

Twenty-second Day of January 1980

[SEAL]

Attest:

SIDNEY A. DIAMOND

Attesting Officer

Commissioner of Patents and Trademarks